April 1, 1924.
G. A. WEIDELY
1,489,180
PISTON CONSTRUCTION
Filed June 11, 1921
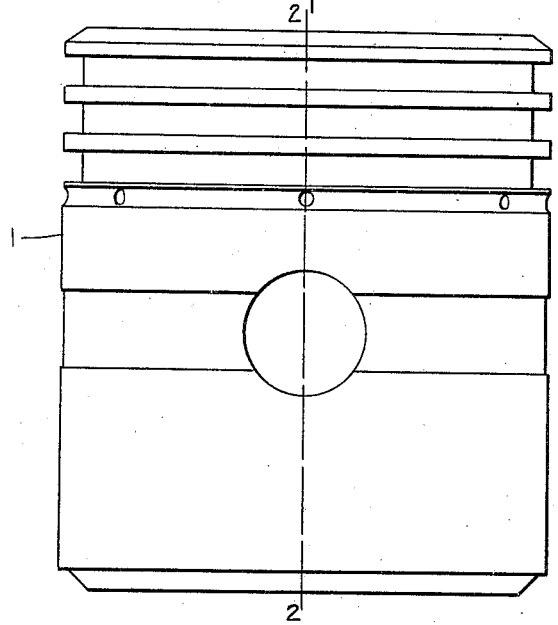
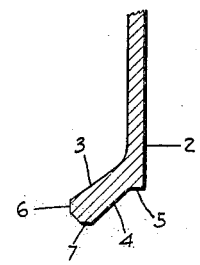
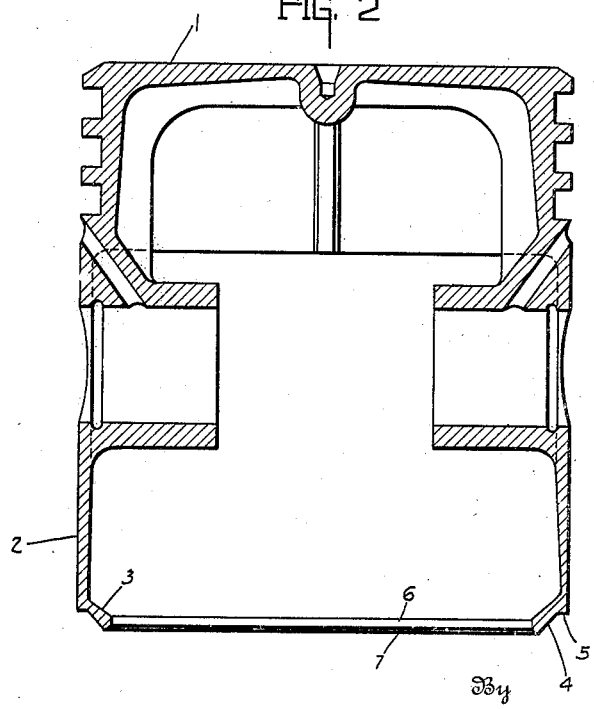
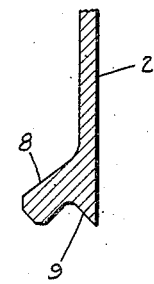
Inventor
GEORGE A. WEIDELY.
By
Attorney Patented Apr. 1, 1924.

1,489,180

UNITED STATES PATENT OFFICE.

GEORGE A. WEIDELY, OF INDIANAPOLIS, INDIANA.

PISTON CONSTRUCTION.

Application filed June 11, 1921. Serial No. 476,819.

*To all whom it may concern:*

Be it known that I, GEORGE A. WEIDELY, a citizen of the United States, residing at Indianapolis, in the county of Marion and State of Indiana, have invented certain new and useful Improvements in Piston Construction, of which the following is a specification.

This invention relates to the manner of constructing pistons for internal combustion engines wherein a lubricant is employed for lubricating the walls of the cylinders and the parts employed for operating the pistons in the cylinders, and the prime feature of the invention is in so constructing parts of the piston that a lubricating system may be used which will circulate large quantities of oil for the main bearings and connecting rod bearings without over lubricating the cylinders. In devices of this class considerable difficulty has been encountered in over lubrication due to troubles other than the lubricating system, such as poor grade of fuel causing crank case dilution due to unburned fuel getting down past the piston and thinning the oil, poor piston fits, bad rings, and in trucks and tractors from the dust getting into the motors through the carbureter and wearing or cutting the cylinder walls.

To this end a drain lip is provided at the bottom edge of the hollow or skirt portion of the piston which is so constructed that the lubricant from the wall of the cylinder or from the interior of the piston will drain inward and descend into the crank case without touching the cylinder walls.

A further feature of the invention is in so constructing the drain mechanism that the oil will leave the drain mechanism at a fixed definite point.

A further feature of the invention is in so constructing the drain mechanism that the skirt portion of the piston will be greatly reinforced and the drain mechanism may be formed integral with the skirt portion of the piston or made separate therefrom as may be desired.

In some instances it is desirable to provide a greater amount of lubrication for the wall of the cylinder than under ordinary circumstances, in which event means are provided for causing a portion of the lubricant to flow back onto the wall of the cylinder while the major portion of the lubricant is carried away from the walls of the cylinder and caused to descend into the crank case at a point removed from the wall of the cylinder.

Other objects and advantages will be hereinafter more fully set forth and pointed out in the accompanying specification.

In the accompanying drawings,

Figure 1 is a side elevation of a piston showing the drain mechanism applied thereto, Figure 2 is a sectional view as seen on line 2—2 of Fig. 1.

Figure 3 is an enlarged detail sectional view, through a portion of the skirt of the piston, showing one form of the drain mechanism applied thereto, and Figure 4 is a similar view showing a slightly different form of drain mechanism.

Referring to the drawings, 1 indicates the piston proper which is provided with a skirt portion 2, as is usual, said piston being of the conventional type used in connection with internal combustion engines.

In devices of this class it is customary to provide means for lubricating the parts employed for operating the piston and considerable difficulty has been encountered in preventing the lubricant from entering the explosion chamber of the cylinder above the piston to such an extent as to interfere with the proper operation of the spark plugs or the explosion within the cylinder, frequently causing excessive smoke from the burning of the lubricating oil. To overcome these objectionable features, means is provided at the lower end of the skirt 2 for draining the lubricant away from the wall of the cylinder and causing it to discharge into the crank case at a point removed from the cylinder wall, comprising a drain lip or flange 3 which is directed inwardly and downwardly at an angle to the vertical trend of the skirt 2, the outer inclined face 4 of the lip 3 being set in a prescribed distance from the outer edge of the skirt 2 to provide a right angular edge 5 between the outer face of the skirt and the inclined face 4 of the lip 2, said edge 5 serving to cut the lubricant from the wall of the cylinder as the piston descends therein, and owing to the inclination of the lip 3 the lubricant so removed from the wall of the cylinder by the edge 5 will move away from the cylinder wall and drain downwardly on the outer face 4 of the lip 3.

To provide a fixed definite point at which the oil will collect and leave the lip 3, the inner end of the lip is provided with an end face 6 substantially at right angles to the trend of the lip, which terminates at its lower end in a tapered face 7 so that the lubricant, when descending either the outer or inner face of the drain lip 3, will collect at the lower edge of the tapered face 7 and discharge from the lip at this point, and as said tapered face is positioned a distance inwardly from the outer face of the skirt 2 the lubricant will descend into the crank case without again coming in contact with the wall of the cylinder.

In some instances it is desirable to retain a certain amount of the lubricant on the wall of the cylinder and to readily accomplish this result and at the same time prevent the lubricant adhering to the wall of the cylinder in quantities to pass by the piston that form of device shown in Figure 4 is provided. In this construction the lip 8 is constructed substantially the same as the lip 3, but instead of providing the right angular edge 5, a downwardly and outwardly tapered edge 9 is formed between the outer edge of the skirt 2 and the outer inclined face of the lip 8, the said edge 9, while cutting the lubricant from the wall of the cylinder, causes a portion of the lubricant so removed to flow back onto the face of the cylinder ahead of the descending piston, and in this manner a constant flow of lubricant over the face of the cylinder is provided.

The drain lip 3 not only reinforces the skirt portion 2 of the piston at a point where reinforcement is materially needed, but excess lubricant which would tend to adhere to the walls of the cylinder and eventually be drawn by vacuum past the piston and into the firing chamber, especially where worn or faulty rings are used, is drained away from the wall of the cylinder and discharged into the crank case at a point removed from the wall of the cylinder. Also, the lubricant thrown into the interior of the skirt of the piston for lubricating parts operating the piston will be prevented from coming in contact with the wall of the cylinder when draining back into the crank case and by providing a narrow lip or tapered face 7 a definite fixed point for the discharge of the lubricant, either from the exterior or interior of the piston is provided, consequently unless that form of device shown in Figure 4 is used all excess lubricant will be removed from contact with the wall of the piston.

In the present day manner of constructing motors it is necessary to have all the parts of the piston and cylinder fitting perfectly to prevent the lubricant from passing into the firing chamber of the cylinder as well as provide suitable drain grooves on the outside of the piston for running the excess oil, which has collected on the skirt of the piston, back to the crank case. But after some use and parts become slightly worn, especially the piston rings which are employed for forming a seal between the piston and cylinder, oil will escape past the piston rings and the piston and enter the upper portion of the cylinder, frequently to such an extent as to interfere with the operation of the spark plug and causing dense smoke to discharge from the motor.

With the present device, however, these objectionable features are eliminated, as the drain lip is positioned at a point on the piston receiving the least amount of contraction and expansion, and consequently maintaining a proper fit with the cylinder for a greater length of time than the upper portion of the piston, overcoming the objectionable feature of over-lubrication and leakage past the piston, even though the piston rings and upper portion of the piston are more or less worn or affected by contraction and expansion. For the purpose of reinforcing the skirt of the piston, the drainage lip is preferably formed integral therewith, as shown, although it will be understood that said lip may be formed separate and attached to the skirt in any suitable manner.

Having thus fully described my said invention, what I claim as new and desire to secure by Letters Patent, is:

1. In draining means for motor pistons, a draining lip connected with the lower end of the piston and extending inwardly and having both faces directed downwardly at an angle to the inner face of the piston, and a fixed discharge point for the lubricant on said lip.

2. A lubricant draining means for pistons, comprising an inwardly and downwardly inclined drainage lip connected with the skirt portion of the piston, the inner edge of said lip being shaped to form a fixed definite discharge point for the lubricant, and means for removing excess lubricant from the wall of the piston.

3. A means for controlling the drainage of lubricant within a motor, comprising a piston having a skirt portion, a drainage lip connected with the skirt portion for conveying the lubricant from the interior and exterior of the pistons inwardly and discharging the same at a distance from the outer face of the piston, means for removing and collecting excess lubricant from the wall of the cylinder of the motor, and means for causing the lubricant to discharge from the lip at a fixed point.

4. Means for removing excess lubricant from the wall of the cylinder of a motor, comprising a piston having a skirt portion thereon, a drainage lip attached to the lower end of said skirt portion of the piston and extending inwardly and downwardly at an inclination, said lip being set inwardly from the outer face of the skirt for forming an edge for removing the excess lubricant from the wall of the cylinder as the piston descends, and means for providing a fixed discharge point for said lubricant at a point removed from the wall of the cylinder.

5. A piston adapted for up and down reciprocation in an explosive engine cylinder, having an annular groove in its lower end whose wall provides an inwardly and downwardly tapering oil draining surface and forms in conjunction with the outer side surface of the piston an annular knife edge for gathering oil from the wall of a cylinder during the down stroke of the piston.

6. A piston adapted for up and down reciprocation in an explosive engine cylinder, having an annular groove in its lower end whose wall provides an inwardly and downwardly tapering oil draining surface and forms in conjunction with the outer side surface of the piston an annular downwardly directed knife edge for gathering oil from the wall of a cylinder during the down stroke of the piston.

7. A piston adapted for up and down reciprocation in an explosive engine cylinder, having an annular groove in its lower end whose wall provides an inwardly and downwardly tapering oil draining surface and forms in conjunction with the outer side surface of the piston an annular knife edge for gathering oil from the wall of a cylinder during the down stroke of the piston, said groove having a depth disposing its bottom above the knife edge.

In witness whereof, I have hereunto set my hand and seal at Indianapolis, Indiana, this 8th day of June, A. D. nineteen hundred and twenty-one.

GEORGE A. WEIDELY. [L. S.]

Witnesses:
   CAREY S. FRYE,
   M. L. SHULER.